Figure 4:
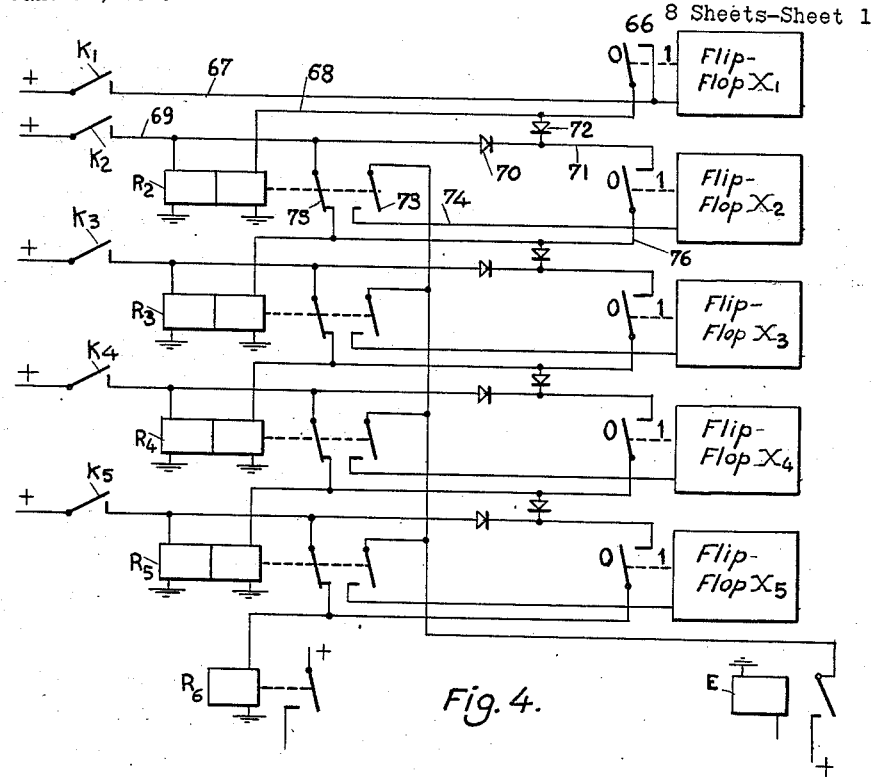

Patented July 6, 1954

2,682,814

UNITED STATES PATENT OFFICE 2,682,814

PHOTOCOMPOSING APPARATUS

René A. Higonnet and Louis M. Moyroud, Cambridge, Mass., assignors to Graphic Arts Research Foundation, Inc., Cambridge, Mass., a corporation of Delaware Application January 12, 1949, Serial No. 70,472

Claims priority, application France January 14, 1948

26 Claims. (Cl. 95—4.5)

The present invention relates to photo-composing apparatus and is more particularly concerned with apparatus of the general type described in our copending applications Serial Nos. 610,334, now Patent No. 2,486,406, of November 1, 1949; 610,335, now abandoned; 610,336, filed August 11, 1945; 700,937, filed October 3, 1946, now abandoned; and 770,320, filed August 23, 1947.

One of the principal objects of the present invention is to provide improvements in the apparatus described in said applications, with particular views to the utilization of certain standard equipment, and the improvement of the speed, accuracy and reliability of the system.

Another object is to provide an improved mode of justification. A still further object is to improve and simplify the introduction of corrections.

With these and other objects in view, as will hereinafter appear, the invention preferably makes use of standard relays, stepping relays and the like, which are well known in the telephone and signaling arts and which have been found capable of operating reliably for an extremely large number of cycles.

A feature of the invention comprises a justifying procedure which may be executed more rapidly and with less special equipment than that described in the above applications. This procedure is outlined as follows: Let the desired length of the line be represented as J (in arbitrary units). Upon actuation of the typewriter keys to a point where the total widths of characters (plus minimal interword widths) fall short of J by some deficit D, the interword spaces are to be increased by distributing D units among the interwords, under the condition, however, that each interword is to be changed only by a discrete number of units. (The requirement for changing interwords by discrete units is for proper actuation of the film carriage, as described in said prior applications.) If N is the number of interwords, the ratio D/N will not in general be an integer. According to our application Ser. No. 610,336, the allocation of the D units to the N interwords is accomplished by adding a certain number Q of units to each interword of one group and Q+1 units to each interword of a second group. According to present invention the same mathematical principles are followed, but an improved apparatus is used. The apparatus includes a counter into which the number of interwords is successively added to the unjustified line length. Thus, the counter successively carries the totals $J-D$ (unjustified line)

$J-D+N$ (first addition)

$J-D+2N$ (second addition)

etc. This procedure is repeated until the value J is equalled or exceeded, whereupon the system is actuated, as will be described later in detail, to effect the proper allocation of width-units to the interwords.

A feature of the invention resides in the use of the binary number system for the computations. As is well known, the binary system has but two digits, 0 and 1, whereby successive integers are represented as 0, 1, 10, 11, 100, etc. (corresponding respectively to 0, 1, 2, 3, 4, etc. in the decimal system). The binary system is preferable for a number of reasons; first because any relay or switch is required to have only two positions, as an attracted or retracted position of an armature, or a closed or open circuit, representing a "yes or no," or a "0 or 1" condition only. Another advantage is in the fact that subtractions can be more readily made than in other systems. Subtractions are used in correcting, and can be effected in the binary system by a relatively simple process of inversion.

Other features of the invention consist of certain novel features of construction and combinations and arrangements of parts hereinafter described and particularly defined in the claims.

Figure 1:
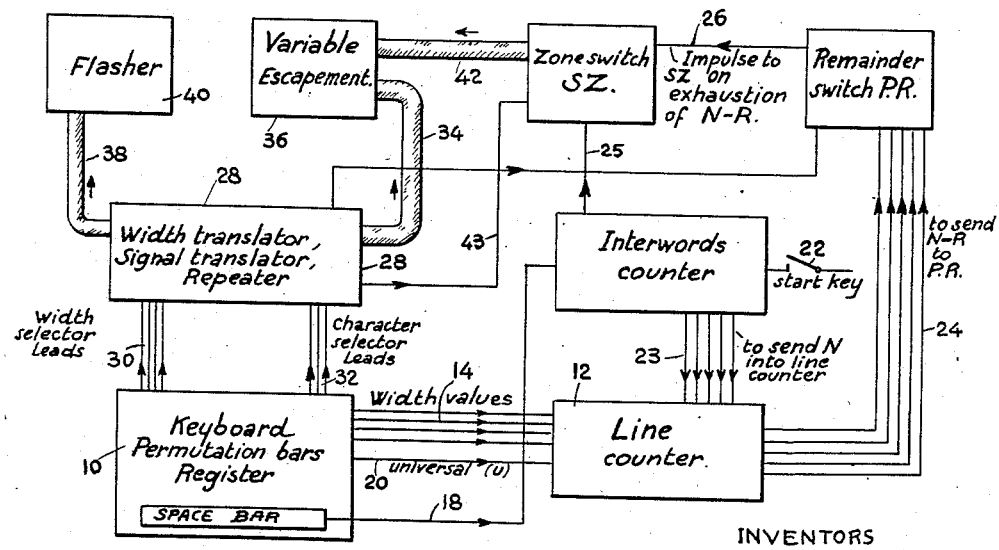
Figure 5:
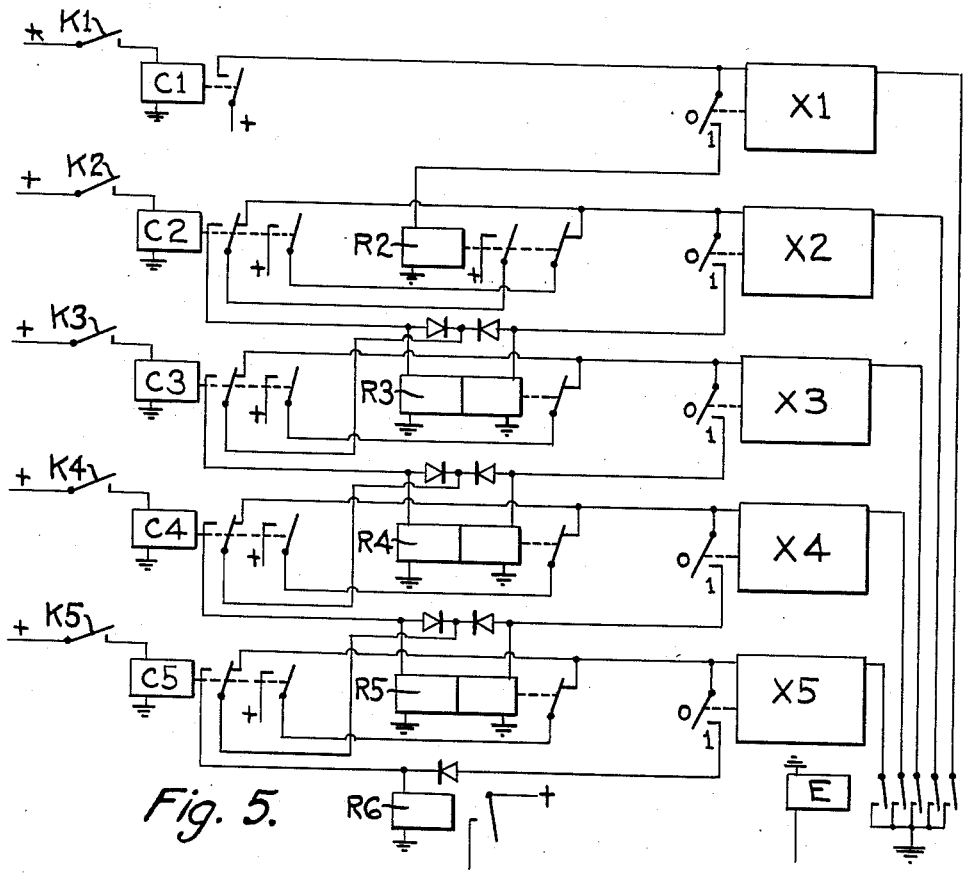
Figures 2, 3:
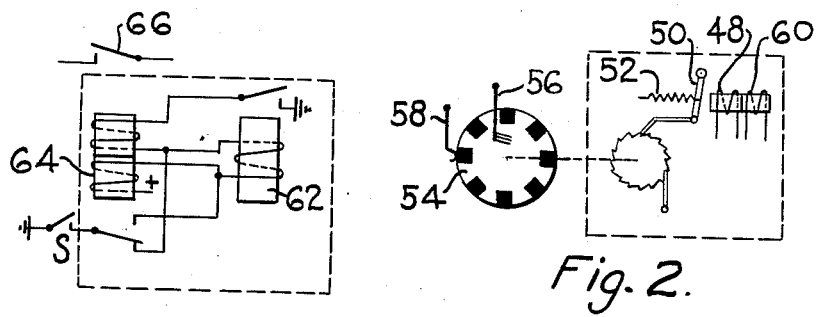
Figure 6:
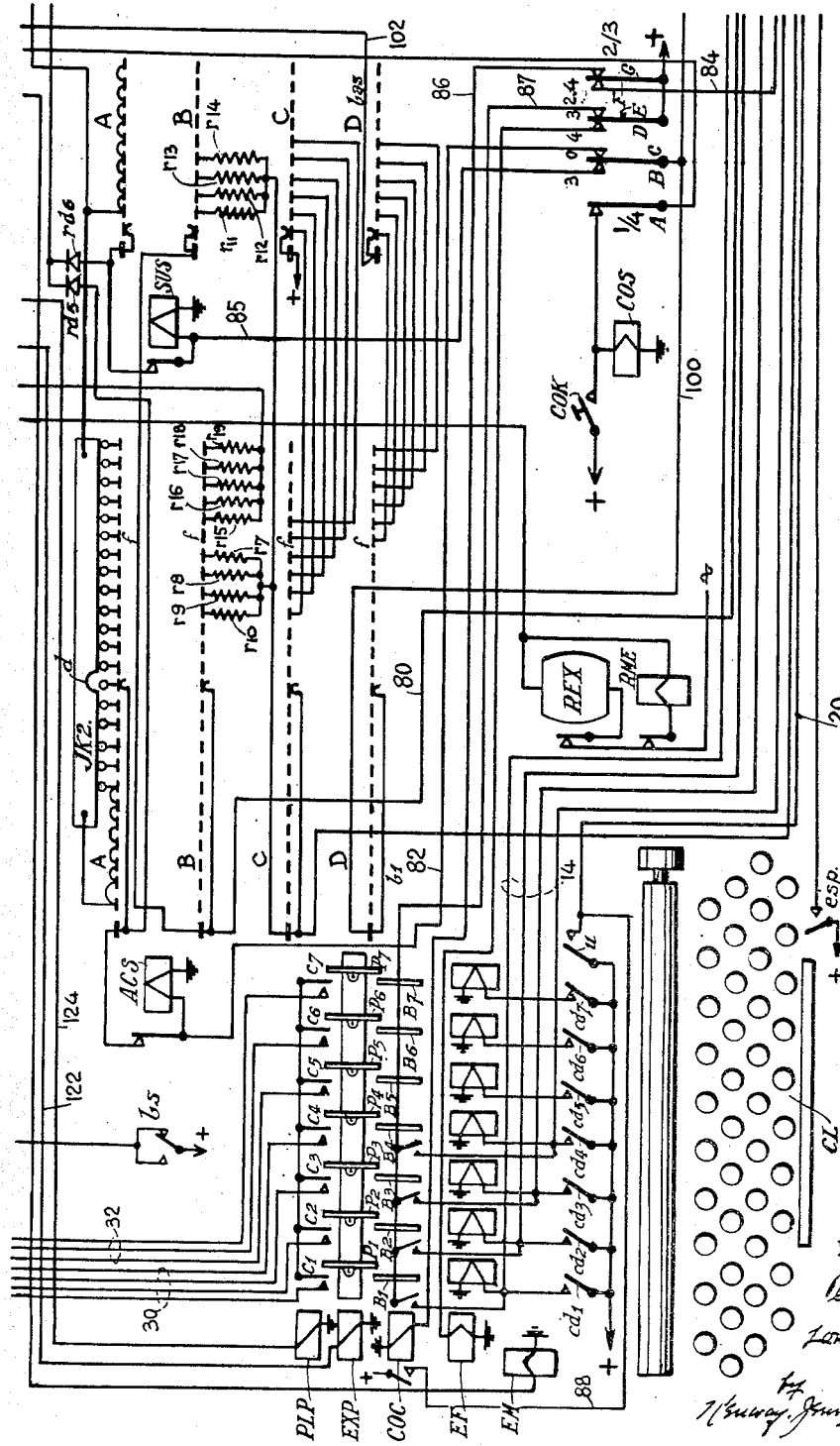
Figure 7:
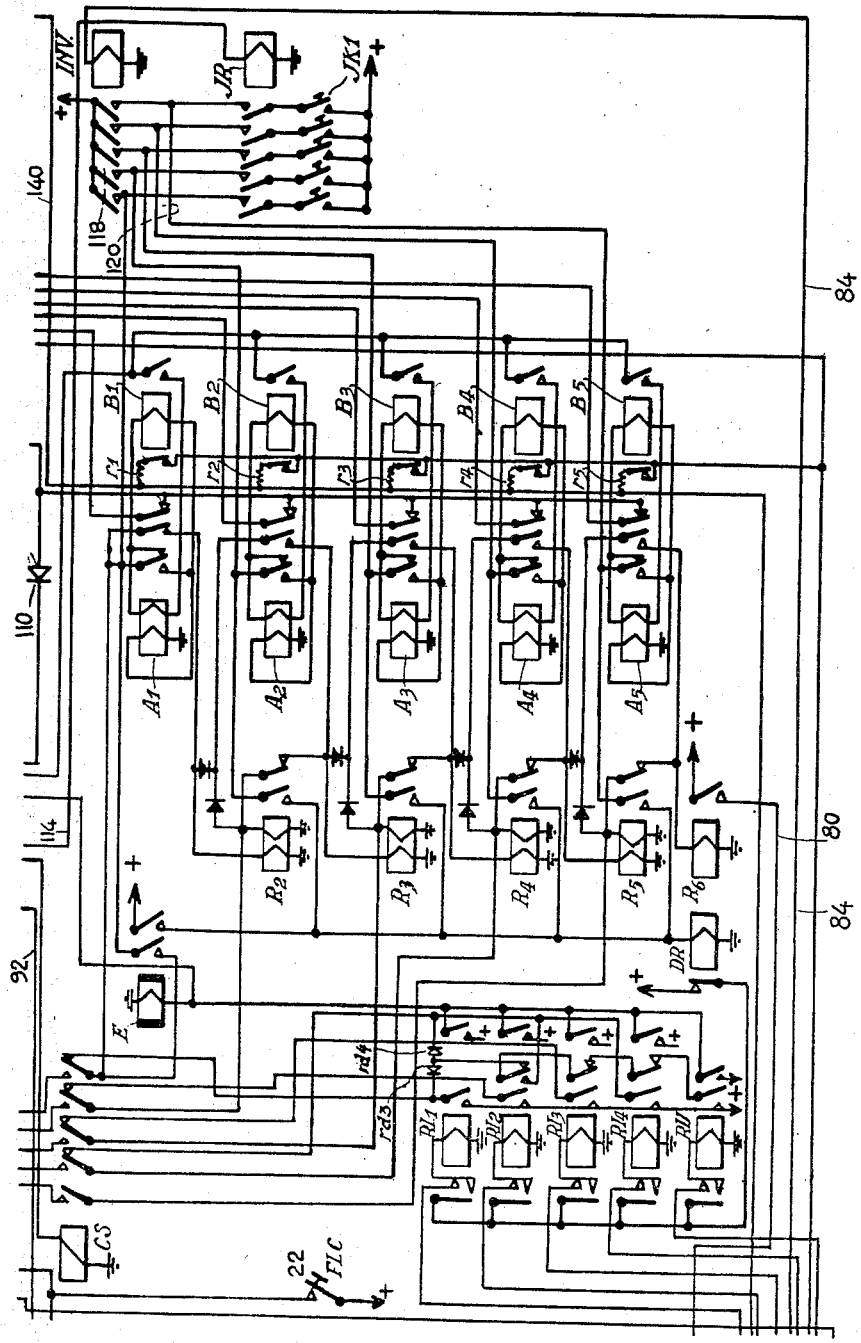
Figure 8:
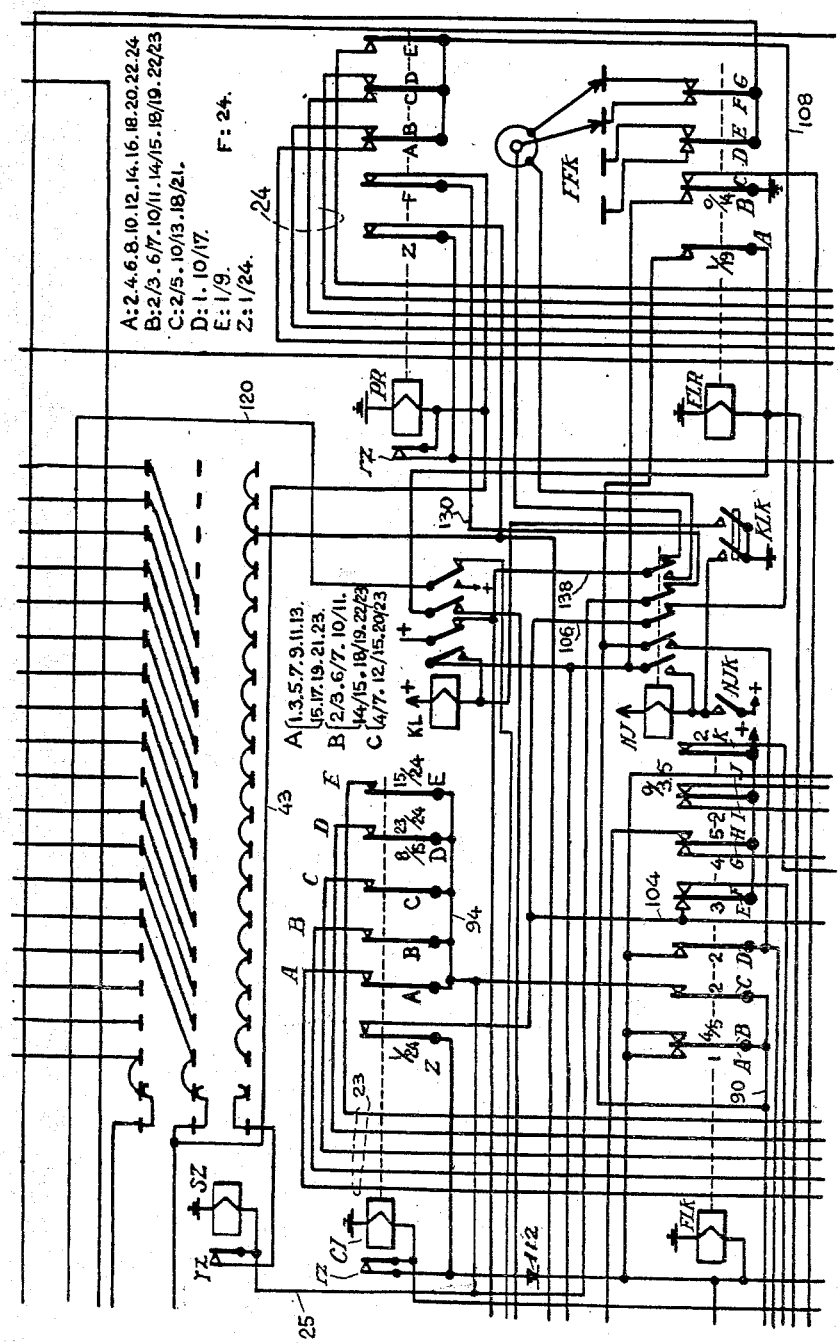
Figure 9:
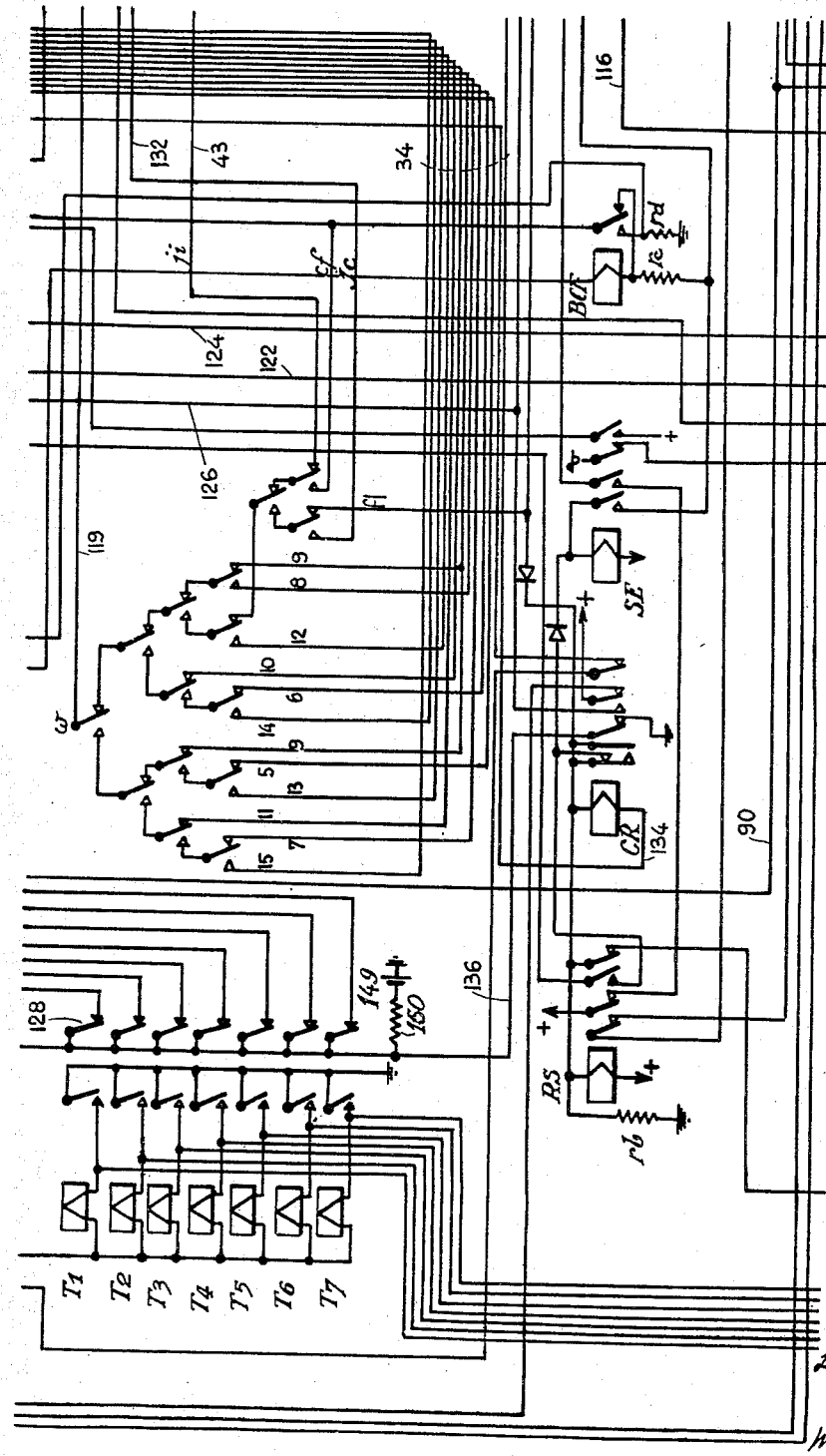
Figure 10:
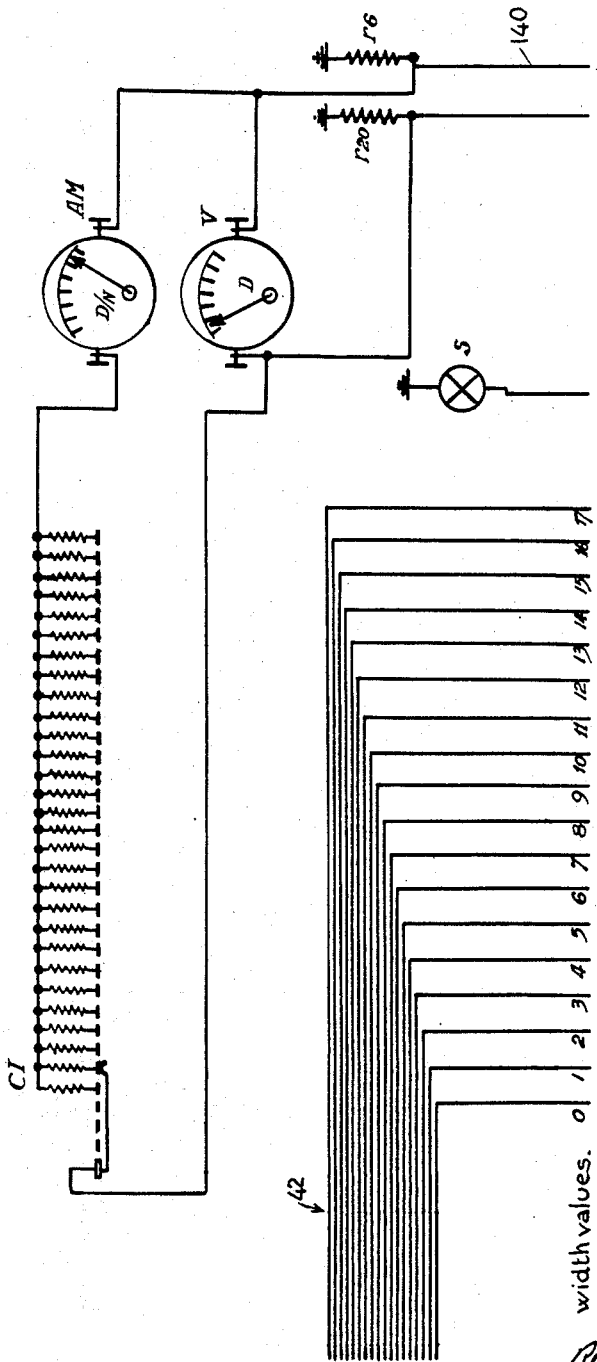
Figure 11:
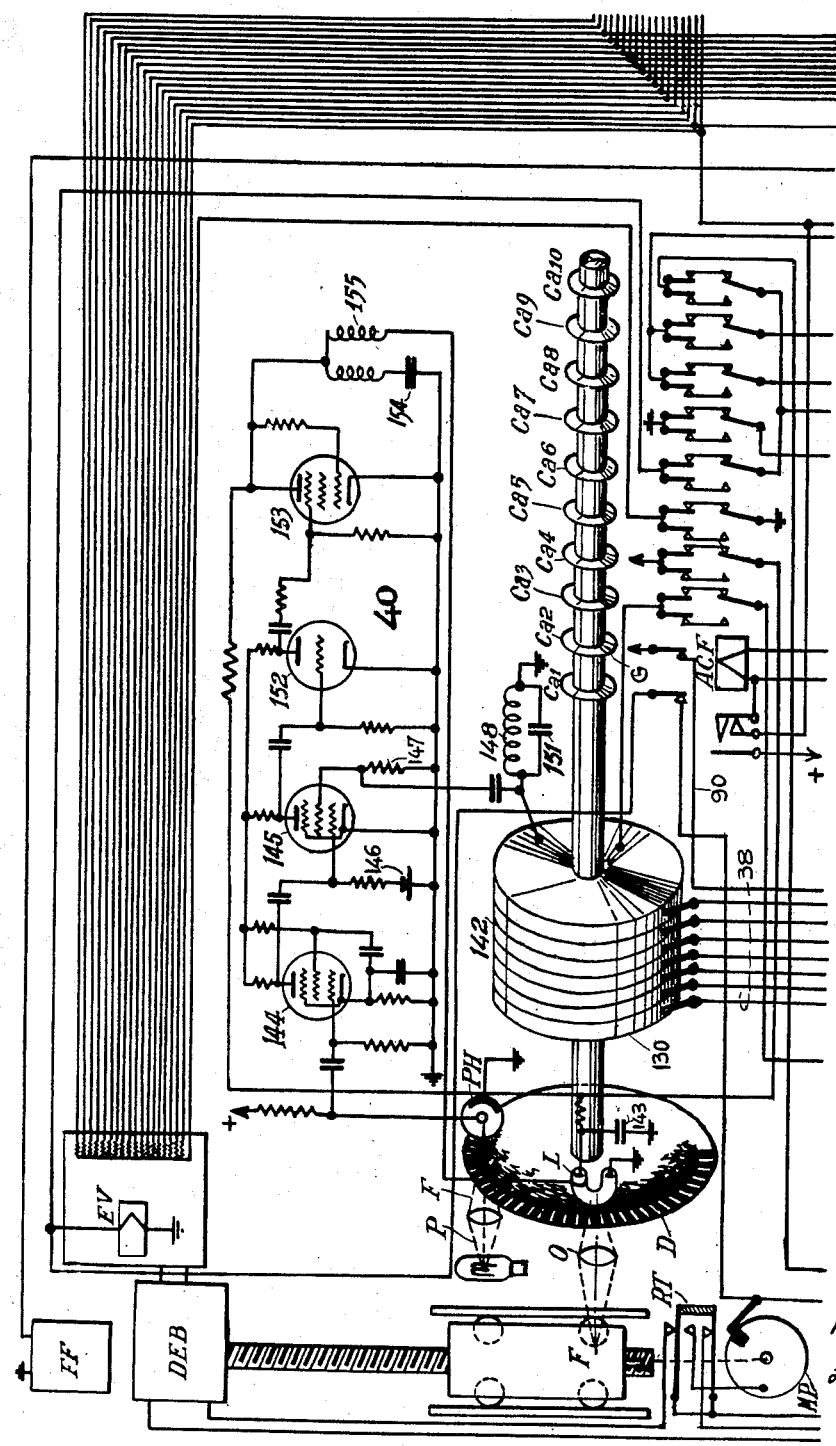

In the accompanying drawings Fig. 1 is a block diagram of the preferred embodiment of the present invention; Figs. 2 and 3 are diagrams of flip-flop circuits; Figs. 4 and 5 are diagrams of counting circuits; Fig. 6 is a diagram of the keyboard and associated equipment; Fig. 7 is a diagram of the line contour and associated equipment; Fig. 8 is a diagram of the interword counter, zone switch, remainder switch and associated equipment; Fig. 9 is a diagram of the width translator and associated relays; Fig. 10 is a diagram of the meter control; and Fig. 11 is a diagram of the flasher and variable escapement circuits.

Block diagram

The invention will be described in connection with the block diagram of Fig. 1. The apparatus indicated in the block 10 at the lower left hand corner of Fig. 1, comprises the typewriter having a keyboard, the permutation bars actuated by the typewriter keys and the register for storing the coded information corresponding to the selection of a given character. As explained in our copending application, Ser. No. 770,320, the system preferably includes a register having two sets of pins whereby the coded information already stored on one set of pins may be coded and transmitted to the flash unit and variable escapement while a subsequent line is being typed on the typewriter. In common with usual printing techniques various characters of the font are allocated arbitrary width-values. For example, in a representative font, the width values of i and l are 5 units; f and j, 6; a, g and numerals, 9; b, h, n and s, 10; T, F and L, 12; M, H and W, 15. An arbitrary minimum interword value is also assigned which, by way of example will be taken as 4 units.

On each actuation of any character of the typewriter, the register is operated to store the required information. Also on each actuation of a character the width value thereof is transmitted to the line counter 12. For this purpose four leads 14 connect the block 10 with the block 12 in Fig. 1. It will be noted from the above that twelve different width values, ranging from the interword value (4 units) to W (15 units) are generally sufficient to cover all possible fonts. For this it suffices to have four leads 14 (because $2^4=16$), although if a greater number of width values are required, a larger number of leads may be used.

Each actuation of the space bar, in addition to adding 4 units to the line counter, adds one into the interword counter CI, whereby the line counter accumulates the number of width units from the beginning of the line and the interword counter accumulates the number of interwords. For this latter purpose, a connection 18 runs from a switch operated by the space bar of the typewriter to the interword counter CI.

In addition to the leads 14 connecting the permutation bars with the line counter, there is a lead 20 operated by a "universal" switch for purposes to be described later.

At the completion of the typing of a line, the line is read by the operator and if it appears correct the operator presses a manual start key 22, which initiates operation of the justifying mechanism and thereafter automatically starts the printing cycle. The justifying operation will now be briefly described.

Let J represent the desired length of the line in the arbitray units and let L be the total width of all of the characters and minimum interwords, as stored on the register. The line is too short by the deficit D so that $J-L=D$. The object of justification is to distribute among the interwords the deficit D so that the length of the line will be increased from L to exactly J.

Let N be the number of interwords; then the relation between the deficit D and the number N may be expressed as follows:

$$D=NQ+R \qquad (1)$$

where Q is the integral value of the quotient of N into D, and R is the remainder. If we were to add to each interword the quantity $Q+R/N$, it would necessitate the use of a film carriage capable of being displaced by any fractional amount of one length unit. Such devices have the disadvantages that they are delicate in adjustment and that the errors accumulate from one interword to the others. On the contrary in variable escapement devices which move only by discrete number of units, errors do not accumulate. In order to take advantage of this type of variable advance mechanism for the film carriage the justifier adds Q units to the first $N-R$ interwords, and $Q+1$ units to the last R interwords. The number of length units thus added is $$(N-R)Q+R(Q+1)=NQ+R=D \qquad (2)$$

The operation of the justifier will be described in conjunction with a numerical example. Let us suppose that D equals 41, (that is, the line is 41 units too short) and that the number of interwords N equals 12.

Into the line counter 12 we now introduce the number N successively. This is done through the five leads 23 connecting the interword counter 16 with the line counter 12. In the example chosen the deficit D is therefore successively reduced from 41 to 29, to 17, and to 5. At the fourth addition the capacity of the counter is exceeded (and in the example chosen it is exceeded by exactly 7 units). The number of times that N has been added into the counter to tip the counter over is then exactly $Q+1$. The amount by which the capacity is exceeded is $N-R$. We now write the general Equation 2 again, and under it we write the numerical values for this example as follows:

$$(N-R)Q+R(Q+1)=NQ+R=D$$
$$7\times3+5\times4 \qquad =12\times3+5=41$$

There is provided a remainder switch PR which is connected to the line counter 12 by a set of five leads 24. The counter, as heretofore noted, displays at this time the number 7 (or in general, $N-R$). This value of $N-R$ is transmitted over the leads 24 to be recorded in the remainder switch PR.

There is also provided a zone switch SZ connected with the interword counter by a lead 25. This zone switch is first caused to store the number Q which is to be applied to the first $N-R$ interwords; for this example the zone switch is set at the value 3 which is to be applied to the first 7 interwords. A lead 26 connects the remainder switch PR with the zone switch SZ and acts to send into SZ an impulse on exhaustion of the value of $N-R$ from the remainder switch PR. In other words, as the escapement of the film carriage operates, the remainder switch PR is caused to move one step nearer its home position for each interword. Upon arrival at its home position, which means that the first $N-R$ interwords have been increased by Q, the impulse from PR changes the zone switch from Q to $Q+1$, whereby the remaining R interwords are increased by $Q+1$. (In the example chosen, PR takes 7 steps to its home position, and then changes the zone switch from 3 to 4 units for the remaining 5 interwords.)

Referring again to the block diagram, there is provided a block indicated at 28 and designated width translator, signal translator and repeater. This block 28 is connected to the block 10 by two sets of leads, designated as a set of four width-selector leads 30 and a set of three character-selector leads 32. These leads are energized by the reading mechanism of the register. The four leads 30 serve to select the width of the character and to initiate correct operation of the variable escapement mechanism. The three leads 32 select the required characters from all characters, having the same width. For example, b and h have the same width so that the leads 30 carry the same impulses therefor. However the leads 32 carry different impulses for these two characters. If not more than eight characters have the same width, three leads 32 are sufficient.

Actually in most fonts there are more than eight characters for some of the widths. This may be taken care of by additional leads 32, but as will be shown later, such additional leads are not necessary since the leads 30 are not filled to capacity for width selection, and "empty" values thereof may be used for character selection.

From the width-translator 28 a cable of twelve leads 34 runs to the variable escapement mechanism 36. This is the variable escapement for the film carriage, which may be of the type described in our application Ser. No. 610,336 or 770,320. The impulses in leads 30 and 32 are transmitted through a signal translator and repeater through seven leads 38 into the flasher unit 40 by which the selected character is illuminated at the proper time to throw its image on the photographic sheet as described in our copenging applications, Ser. No. 610,335 and 610,336.

The zone switch SZ is connected through seventeen leads 42 with the block 36. Whenever an interword is called for by the leads 30 and 32, the flasher is not operated but a signal is sent from the signal translator to the zone switch SZ over a lead 43. The width of the interword is determined by the setting of the zone switch, whereby a signal is transmitted into the variable escapement mechanism through one of the leads 42. The minimum interword width is 4 units, and since the maximum found necessary is 18, the leads 42 are more than are needed for ordinary justification. However, since interwords of 1, 2 and 3 units are not used, these values are reserved for justification between the characters of a word, as will be explained later. In the example chosen the zone switch will signal the variable escapement mechanism for an increment of 3 units for the first seven interwords and an increment of 4 units for the last five interwords, whereby the actual spaces will be 7 units for the first seven interwords and 8 units for the last five interwords.

So far the mathematical principles on which the justification is based have been described as if the computations were carried out in the decimal system. The actual computations are, however, preferably carried out in the binary system. The structure of the various units and the mode of computation in the binary system will presently be described in detail. However, since one of the important units in the system is a special counter, the principles of operation of the counter will first be explained, after which the actual components of the system will be described in detail.

*Line counter*

It has been explained in the copending application Ser. No. 610,336, how the key bars of the typewriter operate a set of permutation bars and close their associated contacts according to the code combination allocated to the various characters. We shall only consider here the first four contacts which characterize the character widths. The corresponding four contacts are connected to the four entries of the binary counter. It is clear that these four entries must be adapted to operate simultaneously since the permutation bar contacts are simultaneously operated. The result of the addition of these various numbers in the counter is recorded in binary or accumulating relays, or combinations of relays. These relays are such that they have two stable positions, and they move from one position to the other when current is applied and interrupted, and then remain in this latter position. For this reason they may be called flip-flops. Figure 2 shows an embodiment using a stepping relay or switch commonly used in telephony. This relay comprises a pawl 44 and ratchet 46. When the current is applied to the magnet 48 the armature 50 pulls the pawl backwards against a spring 52 and when the current is cut off the pawl advances the contact disk 54 one step. One brush 56 engages the disk near its center and the other brush 58 either engages the metal portion to close the circuit or lies on an insulating portion to open the circuit. Thus the circuit is closed following every second energization of the magnet 48. An auxiliary magnet 60 is also supplied for a purpose to be described later.

Figure 3 represents a so-called flip-flop circuit which gives the same results but which uses ordinary telephone relays instead of the more expensive rotary switches. In Fig. 3 when the ground is applied through switch S, current flows through relay 62 and one winding of relay 64 in series, but the single winding of 64 is too weak to operate 64. (The term "operate" is used herein to refer to an attraction of the armature.) Hence relay 62 alone operates. When the switch is opened the second winding of 64, which during the impulse was connected to ground on both sides is now excited, and both windings of 64 and the winding of relay 62 remain energized. Both armatures are attracted. When the switch closes a second time relay 62 has both terminals connected to ground and releases, but 64 remains operated by its half winding. (This is a well-known type of double-winding relay in which one winding is unable to operate the relay but is able to maintain it in the operated condition.) When the switch is opened 64 releases and the cycle can repeat. Contacts 66 controlled by relay 64 are adapted for connection in an external circuit. These contacts close for every two actuations of switch S and hence function in the same manner as 56, 58 of Fig. 2.

If we consider now the binary relay of a given stage it is clear that it must operate when one impulse is applied to it, and that it must carry over this same impulse to the higher order if it is already in its operated or "one" position, and that it must not transmit a carry impulse if it is in its "zero" position. However, if a stage receives both a carry-over impulse from the lower order and a direct impulse it must not operate, but must carry over a single impulse to the next higher order, whatever its own initial position may be.

Figure 4 is an example of an embodiment of a binary counter which fulfils these requirements. It comprises as many flip-flop relay circuits as there are stages. The flip-flop circuits are shown at X1, X2 and X3 and may be of the form enclosed within the dotted lines of Fig. 2 or Fig. 3. Each flip-flop circuit is provided with contacts which are closed when the flip-flop circuit is in position "1" and open when it is in position "0." The contacts are shown at 66. Such simple make contacts on the flip-flop circuits would be sufficient if the entries on the various stages were not simultaneous, but occurred in succession.

When a flip-flop circuit receives a carry over potential from the preceding stage and an operating potential from its own stage it is not convenient to operate this flip-flop circuit twice. A more rapid and convenient arrangement is such that a flip-flop circuit of a stage in which a double entry occurs is prevented from operating at all, but it sends the next higher stage a carry-over potential. The circuit shown in Fig. 4 fulfills these conditions. All stages are identical except the first one which, of course, cannot receive any carry-over potential. Each stage is provided with a carry over relay R2, R3, etc. These relays have two windings in opposition relation and operate whenever one winding is energized and remain at rest when both windings are energized. The input to the first stage is through a lead 67 having contacts (shown as a key K1), said lead being connected direct to X1 and also to one of the contacts 66. A carry-over lead 68 runs from contacts 66 of X1 to one winding of R2. The input lead 69 of the second stage runs through K2 to the second winding of R2 and also through a rectifier 70 and lead 71 to contact 66 (but not to the flip-flop circuit X2 itself). A second rectifier 72 is connected between leads 68 and 71.

The relay R2 has make contacts 73 connected by a lead 74 with X2, and break contacts 75 connected with the input lead 69 of its own stage and with a carry-over lead 76 running from contacts 66 of X2 to one winding of R3.

The third and subsequent stages are simply a repetition of the second stage.

It will be observed that the counter of Fig. 4 has the advantage that a carry-over impulse is transmitted through all necessary stages without requiring successive operations of the relays. For example, if the three X-relays are all in their 1-positions (corresponding to 111 in the binary system or 7 in the decimal system), closure of K1 sends a carry-over impulse directly through 66 of X1, rectifier 72, lead 71, contacts 66 and lead 76 of the second stage, and through exactly similar connections of the third stage, direct to the fourth stage. Also the flip-flop relays of the first three stages convert to the "0" condition in unison. The relay E is not operated to allow the flip-flops to operate until after the carry-over relays have assumed their correct positions. The ultimate result in this example is to record 1000, the sum of 111 and 1 in the binary system.

As a practical measure which will be explained later, relay E is introduced with contacts in the ground leads of the X relays. At this time it will be assumed that relay E is energized and its contacts are hence closed.

Let us consider the second stage, for instance. When a single entry is made, either from stage I through the closed contact (position 1) of flip-flop circuit X1 or by a control potential applied by key K2, relay R2 operates since one of its windings only is energized. By its make contact it operates flip-flop circuit X2. If flip-flop circuit X2 is on position "1" this operating potential is also transferred to relay R3 of the following stage and so on.

If, on the contrary, there are two simultaneous entries, one carry-over from the first stage through K1 and the contact 66 of flip-flop circuit X1 (in its closed or "1" position) and key K2 of the second stage relay R2 does not operate since both its windings are energized and the operating potential is transferred by the break contact of relay R2 at rest to relay R3 of the following stage.

Fig. 5 shows another embodiment in which the permutation bars actuate input relays C1, C2, C3, C4, C5. In this form the carry-over relay R2 has only a single winding. All other carry-over relays have two windings, either or both of which will operate the relay. The connections are not described in detail but the operation is clear from the drawing. Let us take as an example, X1 on position 1 and relays C1 and C2 operated by the permutation bars. Switch X1 is excited by C1, relay R2 operates, and the potential given by the make contact of R2 is not applied to the binary relay X2 but transfers a carry-over signal by the transfer contact of C2 and energizes relay R3 which operates by its first winding. By the transfer contact of C2 and the break contact of the transfer contacts of C3 at rest X3 is excited. Rectifiers are provided to prevent the unwanted operation of carry-over relays of lower orders. It is thus seen that carry-over relays can be operated by two methods; either when the preceding switch contact transmits a carry-over potential, or when the preceding carry-over relay is operated and a simultaneous entry is made. The relay E in Fig. 5 serves the same purpose as its counterpart in Fig. 4.

When it is desired to make a subtraction, as for example in the case of an error, it is sufficient to reverse the position of all the flip-flop circuits, add the number to be subtracted and reverse again the position of all the flip-flops. This is readily done with stepping switches, since it is only necessary to energize the auxiliary winding 60 of each relay (Fig. 2) for this purpose. By exciting all these auxiliary windings simultaneously the positions of all the switches are reversed. The subtraction procedure for telephone relays will be described later.

*Justifier computation*

The operation of the justifier mechanism will be described in relation to the detailed diagram shown in Figs. 6 to 11. The typewriter is shown in the lower left hand corner of Fig. 6. When the operator depresses one key he operates a number of the permutation bars (as described in our copending application Ser. No. 610,336) and closes the corresponding associated contacts $cd1$, $cd2$, $cd3$, $cd4$, which characterize the character width and contacts $cd5$, $cd6$ and $cd7$ which differentiate the characters of same width and do not enter into the justification process. Since the permutation bar contacts may be closed for slightly different lengths of time intermediate relays RI-1, RI-2, RI-3 and RI-4 are introduced between the permutation bar contacts and the counter. These relays are operated through leads 14 by the permutation bar contacts $cd$ and lock themselves by holding circuits established through their make-before-break contacts and a now-closed break contact of a special delay relay DR. In this way it is possible to maintain these relays operated for an appropriate length of time whatever the duration of closure of the permutation bar contacts. The intermediate relays, when operated, apply a battery to the counter input leads through a switching relay CS at rest. The counter (Fig. 7) comprises five stages with five carry-over relays R2 to R6 and five binary relay combinations A1—B1 to A5—B5 of the type described in Fig. 3. The entire counter of Fig. 7 is identical with that of Fig. 4, the A1—B1, A2—B2 relay combinations being the same as X1, X2, etc. of Fig. 4. Four stages are sufficient to take care of the character widths but it is desirable to provide an additional counter stage in order to take care of more than 15 interwords, since as previously noted, the number N of interwords is fed into the line counter through the leads 23. Whenever any key of the typewriter keyboard CL is depressed a contact $u$, called universal contact, is operated. This contact operates a relay RU which also locks itself on the break contact of relay DR. Another relay E is operated by make contacts of relays RI-1 to RI-4 and RU in parallel. The object of this relay E is to delay the application of the battery to the binary relays and thus give to the carry-over relays R2 to R6 the time to operate and prepare the circuit.

When the five-stage binary counter reaches its capacity an impulse is sent to the stepping switch ACS (accumulating switch) which advances one step. Switch ACS is a stepping switch (Fig. 6) which advances one step for each 32 units counted on the binary counter. It may be viewed as a scale-of-32 counter which has a capacity sufficient to store the total number of units in the line. The impulse is transmitted as follows: When the binary counter exceeds its capacity a circuit is completed through the carry-over relay R6 in the same way that carry-overs are effected at any stage of the counter itself, as explained in connection with Fig. 4. When R6 closes its contacts it transmits a pulse over a lead 80, a contact of switch COS to be later described and a lead 82 to ACS. Energization of the winding followed by deenergization after R6 opens causes a one-step advance of the contacts of ACS.

It has been noted that the relay RU is used to provide for the condition in which there are more than eight characters for a given width value, e. g., in a representative font there are twenty characters of 9 units width and fourteen of 10 units. Since widths of 0, 1, 2, and 3 are not needed in a normal font (the narrowest "character" being the minimum interword of 4 units), these empty values may be used to increase the number available for character selection for certain widths. This is most conveniently taken care of by the circuit shown in Fig. 7. The relay RU which operated for every character is effective whenever binary values 0, 1, 10 and 11 appear on the relays RI-1 and RI-2, in other words, whenever RI-3 and RI-4 are not operated. A connection runs from a battery through a make contact of RU, break contacts of RI-4 and RI-3, a transfer contact of RI-2 to the junction of two rectifiers $rd3$ and $rd4$ respectively connected to counter input leads having values of 1 and 8 (binary 1000). Thus, when no RI relay is operated, a signal of value 9 is sent through the two rectifiers into the counter; when only RI-1 is operated, the same value is sent into the counter, the rectifier $rd3$ being shunted by the make contacts of RI-1; when RI-2 alone is operated, its value of 2 is increased to ten by the operated transfer contact connected to the fourth input lead; finally, it follows from the foregoing that when RI-1 and RI-2 are both operated a width value of eleven units is sent to the counter.

Stepping switch nomenclature

For certain of the stepping switches, notably ACS and SZ, the actual step contacts are shown. For others, however, a simplified drawing is used, and the contacts are designated by a standard convention. The various "levels" of the switches are designated by capital letters without subscripts, A, B, C, etc. Thus the correction switch COS (Fig. 6) has seven levels designated A to G. The contacts of the various levels are designated

| | |
|---|---|
| A | 1/4 |
| B | 3 |
| C | 0 |
| D | 4 |
| E | 3 |
| F | 2.4 |
| G | 2/3 |

Each number represents a closed contact. The mark / means that all contacts between the two numbers are closed, while the dot means that all contacts between the two numbers are open. Thus level A is open on its home position 0 but is closed on all steps from 1 through 4. Level B is closed on step 3 only, C on position 0 only, D on 4, E on 3, F on 2 and 4 (but open on step 3) and G on 2 and 3. This convention will be used throughout.

Correction procedure

Before proceeding with the description of the interword counter and associated equipment, the procedure of making a correction will be explained. If the operator sees that he has made an error, it is necessary to erase the wrong character from the register and also to subtract its width value from the line counter, before introducing the correct character. The operator merely resets the typewriter platen back to the wrong character and then presses the correction key COK. This energizes the stepping switch designated COS (correction switch). The subtraction is effected by inverting the binary counter (i. e. changing all 1's to 0, and all 0's to 1), adding the number to be subtracted, and then reinverting the binary counter. This is the mathematical process of subtracting by adding complements; for example to subtract 11 from 1000 in the binary system, invert 1000 to obtain 0111, add 11 to obtain 1010, and reinvert to obtain the result 0101. This latter procedure is carried out by COS, which, when COK falls back, is connected by its level A to an impulse generator G comprising a cam $Ca2$ (Fig. 11) driven by the shaft of the printing unit similar to that described in our copending application Ser. No. 770,320. Switch COS moves therefore 4 steps until it reaches its fifth position which is also its starting position and in which its connection with the impulse source is interrupted. During its rotation this switch controls the following operations: first it disconnects the winding of ACS from the make contact of R6 by its level C-0 (note that the C level provides a closed contact only on position 0). On step 2 by its level F switch COS sends an impulse over lead 84 to relay INV (inversion relay). The inversion relay closes its contacts and sends an impulse over each of leads 129 to all of the relays A1 to A5 and B1 to B5 of the binary counter. From the description of the counter previously given, it will be seen that this will invert each binary stage, that is, it will change a "0" position, wherever it exists to a "1" position, and will change a "1," wherever it exists, to a "0."

On step 3 level B of COS connects the SUS stepping switch (subtraction switch) to the make contact of relay R6 by leads 80 and 85. In other words it has disconnected ACS from this carry-over relay R6 and has connected SUS in its place for a reason to be explained below. On both steps 2 and 3 COS operates by its level G and wire 86 a sensing magnet COC which detects the position of the first four pins of the register to determine the width of the faulty character. In position 3 by its level E COS sends an impulse through lead 87 to the contacts of the COC magnet which are closed by the register pins corresponding to the erroneous character. The contacts of the COC magnet are in parallel with contacts cd1 to cd4 of the keyboard. Hence leads 14 carry to the intermediate relays RI-1 to RI-4 and RU the same values that were transmitted when the erroneous character was set up. The impulse to relay RU is actually provided by means of an auxiliary make contact on COC and wire 88.

If a carry-over occurs at this stage of the correction process it must be subtracted from the accumulating switch ACS since, if a carry over occurs in the subtraction of an erroneous width, it is necessarily because a carry-over also occurred when the erroneous character was typed. To come back to the correct position it would be necessary to step ACS one step back. Since the usual stepping switches are not adapted to move backwards the auxiliary stepping switch SUS has been provided. This stepping switch receives any carry-over which may occur during the subtraction process and moves one step backwards the "end of line" terminal of ACS. In Fig. 7 it may be seen that ACS gives a signal that the capacity of the counter has been reached, or exceeded, when its brush b1 reaches terminal f. But if SUS has moved one step it may be seen that ACS will have to move one more step than normally. In position 4 COS by its level F sends another impulse to relay INV which reverses again the position of all the binary relays. The width of the erroneous character has thus been subtracted from the counter. In position 4 by its level D COS energizes electromagnet EF which pushes back into their set position the register pins of the faulty character. At the end of the fourth impulse switch COS falls into its fifth position (which is also its zero position) where it is disconnected from the impulse source. The correction cycle is now completed and the operator can strike the correct character.

Interword counter

While the length of the line is being recorded in binary numbers in the counter, the interword counter CI records the number of interwords. This counter CI is also a switch of the stepping type and receives an impulse each time the space bar is depressed by the operator. It is provided with five levels A to E which translate the number of interwords into a binary number for use in the justification process and has a capacity of 25, sufficient in practice. In accordance with the convention described above the levels of CI are described as follows:

```
A_____1.3.5.7.9.11.13.15.17.19.21.23
B_____2/3.6/7.10/11.14/15.18/19.22/23
C_____4/7.12/15.20/23
D_____8/15.23/24
E_____15/24
Z_____1/24
```

The operation of the justifier will be described in terms of a numerical example. Let us suppose that the line is 41 units too short, or that in other words the line deficit is equal to 41, and that there are 13 words and consequently 12 interwords. In this case the binary relays of the line counter are all in their operated, or 1, position except relay A4—B4 (8 units missing) and the accumulating switch ACS is one step (32 units missing) from its end position f. 40 impulses are necessary to bring all the line counter relays to their operated ("1") positions and to put ACS on its terminal f, and one more impulse to send a carry-over signal which denotes that the capacity of the counter has been exceeded; i. e. a total of 41 impulses. If $D/N$ is not integral the counter will then display $N-R$.

The number of interwords N has been registered by stepping switch CI which has moved 12 steps under the control of the space bar of the typewriter. This switch is therefore on position 12.

The levels A to E of the interword counter stepping switch CI may be viewed as a converter to convert the number of steps into the binary code. Thus a closed contact on level A represents 1; on level B, 2; on C, 4; on D, 8; on E, 16. Thus, on step 9, the contacts of levels A and C are closed; on step 19, the contacts of levels A, B and E are closed. In the example chosen it is seen that on step 12 the contacts of levels C and D are closed, corresponding respectively to 4 and 8, i. e. 12 in the decimal system.

Setting of justification apparatus

The succession of operations involved in the justification is controlled by a master sequence stepping switch FLK. Switch FLK has the following designation of contacts for its different levels:

```
A _____ 1
B _____ 4/5
C _____ 2
D _____ 2
E _____ 3
F _____ 5
G _____ 4
H _____ 5
I _____ 2
J _____ 0/3.5
K _____ 2
```

When the operator depresses the start key 22 the winding of the switch FLK is excited and when the key is released the switch steps into position 1 where, by its level A its winding is connected by lead 90 to the source of electrical impulses G, at the rate of 10 per second for instance. FLK moves immediately to position 2 where it stops. In this position it operates the switching relay CS which connects the counter to the five levels of CI and by its level C FLK sends an impulse to the common point 94 of the five binary levels of the interword counter CI. As explained above this adds 12 to the line counter for each impulse. The deficit D is therefore successively reduced from 41 to 29, to 17, and to 5. At the fourth impulse the capacity of the line counter is exceeded, and the carry-over relay R6 is operated in the same manner as previously described. An impulse is then transmitted through leads 80 and 100 to level D which at this time is on terminal f, which represents the normal end of the line. (Note that if a correction has been made which required stepping of SUS, the end of the line will be represented by a contact to the right of terminal f.) The impulse continues through a contact on level D of SUS, lead 102, level D of FLK to the winding of FLK. At the end of the impulse FLK steps to position 3 and by opening the contacts of level C stops the sending of impulses into the line counter through CI. At this moment the line counter has "tipped over" and now displays the difference between 12 and 5, i. e. 7. While FLK was in position 2 a switch SZ (zone switch) had its winding connected to the common point 94 of levels A, B, C, D, E of CI by wire 25 and level C of FLK. Switch SZ has therefore moved Q+1 steps, and in the example chosen is now on position 4.

In position 3 of FLK two operations take place. First CI is sent back to its home position, since it is no longer needed, by means of the home return level Z of switch CI which is closed for all positions of CI except position 0, self-cycling contact rz of CI, wire 104, and level E on FLK in the well known self-cycling manner. Second the remainder switch PR assumes its operating position under the control of the counter. It has been explained how the counter has registered $N-R$, equal to 7 in the numerical example described. This means that binary relays A1, A2, and A3 are in their operated or 1 position. These relays, by their break contacts, complete a self-cycling circuit for the remainder switch PR. Switch PR is a stepping switch defined as follows:

A_____2.4.6.8....24 (all even numbers)
B_____2/3.6/7.10/11.14/15.18/19.22/23
C_____2/5.10/13.18/21
D_____1.10/17
E_____1/9
F_____24
Z_____1/24 (home return)

The self-cycling circuit for PR runs from the battery through level E of FLK (in position 3) a lead 106, a normally closed contact of a relay NJ (to be described later) a lead 108 to the common point of levels A—E of PR, and then by leads 24 to the flip-flop relays of the line counter. It may be seen that the self-cycling circuit of PR is thus closed until PR reaches position 18 (for the example chosen) where it stops, that is to say, it stops 7 steps from its end position 25. During these two operations the winding of FLK has been kept energized through the rectifiers 110 and 112. When both CI and PR have reached their positions as described above the battery is disconnected from FLK, which then moves into position 4 where its level B connects it again to the impulse source G, so that it steps immediately to position 6 which is its "home" position. In position 4 of FLK the binary relays whose battery lead goes through level J of FLK have been deenergized and in position 4 FLK operates relay JR (justification setting) from level G through lead 114. The purpose of this will be described presently.

In position 5 of FLK an impulse is also sent by level H by a lead 116 to the electromagnet EM of the typewriter which controls the escapement of the platen so as to place it opposite the first row of register pins and thus in position to type the next line. It must be remembered that it is necessary to locate the platen of the typewriter so that the hammers are out of engagement with the register pins in order that it be possible to shift from one half of the register to the other half by sliding vertically the field of pins.

The justification computation is now completed and we are ready to start photo-composition.

*Justification setting*

The justification relay JR (Fig. 7) has been mentioned. This relay has five sets of contacts 118 in series with five manually operated keys JK1. The contacts 118 are connected to the inputs of the flip-flop circuits of the line counter by leads 120. If none of the keys JK1 are closed the counter remains empty. If any of the keys are closed, corresponding values are initially set into the line counter when FLK sends the impulse in position 4. This cuts down the available capacity of the counter by the values initially set in. For example, if the total capacity of the line counting apparatus (12 and ACS) is, say, 512, and it is desired to write a line of 504 units, 8 units will be set into the binary counter at the beginning of each line, if the fourth key JK1 is kept closed. If the line is to be reduced more than 31 units below capacity, the starting position of ACS is changed by sliding a bar JK2 (Fig. 6) which closes all but one contact d of the home-return level of ACS.

*Photo-composition*

When the register is shifted from one position to the other, a starting contact bs (Fig. 6) is temporarily opened and relay RS (Fig. 9), which was unenergized because both ends of its winding were connected to the battery, operates and locks itself through resistance rb. Relay RS prepares the operating circuit of the carriage relay CR which operates when the starting cam Ca7 closes its contacts at an appropriate moment of the cycle. Relay CR operates and locks itself on the same resistance rb as relay RS. Relay SE, which controls the operation of the sensing carriage EXP of the register, also operates from the same source as CR, but locks itself on level B of a stepping switch FLR (Fig. 8), for which the contact conventions are shown in the drawing. This switch controls various auxiliary operations such as the feeding of the photographic film. Relay CR completes the operating circuit of the film carriage variable escapement which comprises a main motor magnet EV and 18 solenoids which control the amount of escapement and therefore the advance of the film carriage. Simultaneously CR applies a battery to a lead 119 through a normally closed contact of a relay KL to be described later. The lead runs to contact w of the width-selecting circuit comprising relays T1 to T7 (Fig. 9). Contact w is the first of a set of transfer contacts, indicated as fanning-out contacts 121 of the T-relays. These relays are operated through leads 30 and 32 by the sensing springs of the register C1 and C7 shown in diagrammatic form on the left hand side of Fig. 6. When relay SE operates it closes the circuit of the magnet EXP which controls the escapement of the sensing carriage through lead 122 and cam Ca8. SE also closes the circuit of electromagnet PLP through lead 124 and cam Ca9. PLP operates the sensing springs and closes the contacts of those which meet the pins of the register which have been pushed in during the typing of the line by the operator. The corresponding relays T are operated and lock themselves through a holding circuit including cam Ca10, a lead 126 and contacts of relay CR. These relays T have a multiple purpose; first they select the character to be photographed by their break contacts 128 which control the decoder 130 and flash circuit 40 through leads 38; and second, by their transfer contacts 121 they select the stop pins of the variable escapement through leads 34 and thus control the displacement of the film carriage according to the widths allocated to the various characters. When for example the register has pins 1, 3 and 4 in their pushed-in positions, relays T1, T3 and T4 are operated and the wire selected is that of stop pin 13 since the binary value of pin combination 1—3—4 is 1+4+8, i. e. 13. Third, relays T translate coded signals, such as justifiable interwords, "end of line" signal, justification between characters and change of fonts.

When the sensing springs find in the register the pin combination 3, relay T3 alone is operated and the potential is directed through lead 43 to the brush of switch SZ, which is, for the example previously chosen, on position 4. The terminals of switch SZ are connected to the stop pins of the variable escapement as follows: terminal 1 to stop pin 4, terminal 2 to stop pin 5, terminal 3 to stop pin 6, terminal 4 to stop pin 7 and so on. In the present example SZ being on position 4 selects stop pin 7 and the variable escapement advances 7 units for each interword. Simultaneously, however, PR also moves one step for every interword signal, since it also is connected to lead 43. A lead 130 connected to 43 runs through level F of PR and a break contact of NJ to lead 25. When PR reaches its position 24 it sends by its level F an impulse over lead 130 to SZ which then moves one step. Since PR was at 7 steps (in general, N—R steps) from position 24, the first 7 interwords will have a value of 7 units. Thereafter, the remaining R interwords will have a value of 8 units. This makes a total of 7 spaces with 7 units or 49 units, and 5 spaces with 8 units, or 40 units for a total of 89 units. However, since the counter has registered 4 units for every interword typed, the line has been increased only by 89 minus 48, or 41 units. Since this was the value of the deficit in our example, the line is justified.

At the end of the line the register sensing springs find the combination 3—5 which the operator has registered when throwing key 22. Relays T3 and T5 are operated and direct the control battery to the common point of resistance $rb$ and relay RS. Relays RS and CR now have both ends of their windings connected to the battery and hence release. Relay SE however is kept operated for a short time by level B of FLR, since it is necessary to move the sensing carriage a few more steps for restoring the last pins of register into their inactive positions. When CR releases it applies a battery by one of its break contacts to the clutch DEB which normally connects the variable escapement EV to the film carriage. The carriage is thus freed from the variable escapement and goes back to its rest position under the action of its return springs, as described in some of the above-mentioned copending applications. When it reaches its starting position the film carriage operates the contact RT. This disconnects the battery from the clutch and the film carriage reengages with the variable escapement. On the other hand the battery which was applied to the winding of stepping switch FLR is withdrawn by the operation of contacts RT, so FLR moves into position 1 where its winding is connected by its level A to the source of impulses G, and it starts rotating. By closing its make contact, RT has connected the variable escapement motor magnet EV to the battery through control cam $Ca6$ and has energized stop pin 1 of the variable escapement. The film carriage, which has under the effect of its inertia gone farther than its actual starting position, starts advancing step by step until its operating circuit is interrupted by cam $Mp$ which opens the circuit when it reaches its true starting position. The sequence switch FLR maintains SE operated for some time and sends to the film feed device a number of impulses controlling the spacing between lines. The number of impulses is selected by a manual key FFK which selects a given level of FLR, each of these levels sending a different number of impulses.

*Justification between characters*

If the operator wants to justify between characters in the case of short lines when there is but one or no interword he actuates a special space bar between the character actuations, which registers the code combination 3—5—6. In this case the potential is directed by a lead 132 to the upper level of SZ in which the terminals are connected to the stop pins of the variable escapement. By this means, spaces of 0, 1, 2, 3 or any number of units may be introduced between characters. For example, suppose that the words "film carriage" are to be written in a line of 110 units length. The widths of the characters plus the normal interwood space is 97 units. The number of justifying spaces is 11 (including the space between words). This procedure operates automatically to introduce an additional unit between successive letters (and in the interword space which is increased to 5) up to the last two letters. 2 additional units are inserted between "a" and "g" and between "g" and "e."

*Control of non-justified lines*

If the operator does not want to justify a line he throws key NJK before operating key 22. This operates relay NJ and locks it on level B of FLR. The relay NJ therefore remains operated for the duration of both the justification computation and the photography, and a little longer as in the case of relay SE. In position 2 of FLK, relay NJ connects immediately a battery to FLK so that it does not stop on this position and sends but one impulse to CI. In position 3 of FLK relay NJ opens leads 106, 108 and thus prevents PR from being operated. Only CI is operated in this position (through 104) and it goes back to its rest position. FLK goes over positions 4 and 5 as previously described. SZ has received but one impulse and is therefore on position 1 and its brush is connected to stop pin 4 of the variable escapement. All the interwords are thus given the normal minimum spacing of 4 units.

*Line erasure*

If the operator wants to erase a line he operates key KLK (kill-line key) which operates and locks relays NJ and KL. The justification computation does not take place as explained above and relay CR is prevented from operating by a break contact of KL, which removes potential from lead 134. A transfer contact of relay KL supplies a potential to that part of lead 120 which runs to contact $w$ of the translating circuit for the "end of line" signal. A break contact of CR at rest makes the flash circuit inoperative by a lead 136 which short-circuits the decoder. When the end of line signal is found in the register it is applied directly to FLR by a make contact of KL. The film feed circuit is made inoperative by a break contact of KL connected by a lead 138 between FFK and a break contact of KL. FLR makes a complete revolution and keeps SE operated long enough to erase the line completely.

By providing a transfer contact on relay NJ it is possible to select two different levels of FLR for the film feed (or leading) when the line is not justified.

*Indicating devices*

Since the text as it appears on the typewriter cannot give any useful accurate indication of the actual length of the line means are provided to give to the operator sufficient information to enable him to operate the typewriter for satisfactory composition. To this effect two measuring instruments are provided (Fig. 10), one of which indicates the deficit of the line D, and the other one indicates the interword increment D/N. The binary relays B1 to B5 are provided with break contacts which connect in parallel resistances r1, r2, r3, r4 and r5 (Fig. 7), and this parallel combination is connected in series with a common resistance r6 by a lead 140. Each of these resistances is chosen so as to send in to the common resistor r6 a current of a number of milliamperes corresponding to its rank in the binary system. For instance with a battery of 24 volts resistance r1 may have the value of 24,000 ohms with a current of 1 milliamp., resistance r2, 12,000 ohms, resistance r3 6,000, resistance r4 3,000 and resistance r5 1500 ohms. Similarly when switch ACS reaches the justification zone it adds in parallel resistances having the following value: at one step from the end of line f a resistance r7 of 750 ohms, at two steps a resistance r8 of 375 ohms, r9 of 250 ohms and r10 of 187.5 ohms. The current flowing through resistance r6, which has a low value of say 10 ohms, is therefore proportional to the number of unoperated stages in the counter, i. e. to the line deficit. In the case when, on account of a correction, switch ACS has moved one step too much, and the subtraction switch SUS has also moved one step, the resistances connected by ACS would give a current which was too small. For correcting this source of error switch SUS adds in the circuit resistances r11, r12, r13 and r14 having respectively the values of 750, 375, 250 and 187.5 ohms. When however switch ACS reaches, and passes, the end of line position "f" the resistances connected into the circuit by SUS would be the cause of erroneous readings. Accordingly ACS introduces a second series of resistances r15, r16, r17, r18 and r19 of respectively 750, 375, 250, 187.5 and 140 ohms in the circuit of a second low resistance r20, also of 10 ohms. The potential between the terminals of resistances r6 and r20 is therefore truly proportional to the value of the line deficit D, even if several corrections have been made. Voltmeter V gives therefore a reading which may be calibrated in width units. The justification increment D/N is given by a milliameter AM connected across the same points but in its circuit a level of switch CI inserts in series resistances proportional to the number of interwords as shown at the top of Fig. 8. Thus the operator is notified when the justification range is reached, and what the interword increment would be if he stops typing at any moment.

*Flash circuit*

The flash circuit (Fig. 11) operates as follows:
The photographic unit comprises a disk D near the periphery of which are the characters, a lens O projecting an image of these characters on sensitive film F and a flash tube L. The disk rotates continuously and the characters are photographed by sending an electrical impulse in the discharge tube which illuminates for an exceedingly short length of time, a few microseconds. In spite of the great linear speed of the characters sharp pictures are obtained. In order to have an accurate positioning of the characters on the film it is necessary to time the instant of the flash with an extreme precision. This result is achieved by means of a photoelectric impulse generated by a slit F associated with each character. Since it is possible to position on the disk the slit corresponding to a given character with absolute precision, for instance by photographing them simultaneously, the precision does not depend on the relative position of the characters but only of the relative positions of each character and its associated slit. The photoelectric impulse is obtained by a film reader P (of the type used in sound movie projectors) which projects a thin luminous slit on the path of the transparent slits, and a photocell PH. The positioning photoelectric impulses are inoperative until they are allowed to prime the flash tube by means of a decoder of the type described in our copending application Ser. No. 770,320.

The decoder generates, at the moment when the character passes in photographic position a relatively wide impulse which acts on an electronic gate tube which lets the impulse go through. The photoimpulses from photocell PH are amplified by a pentode tube 144 and appear as positive impulses in the anode circuit. They are applied to the control electrode of a gate tube 145, also a pentode with an appropriate bias potential given by the battery 146. This tube 146 is normally non-conductive since its screen grid is connected to the ground by a resistance 147. On the other hand the decoder circuit comprises an inductance 148 and a battery 149. As long as the decoder circuit is closed a small current of a few milliamperes flows in this circuit limited by a resistance 150. When the brushes of the decoder find the combination corresponding to that of the character the circuit is open as explained in the above-mentioned application and an induced voltage appears across the inductance. The amplitude and form of this voltage depend on the resonant circuit formed by the inductance 148 and a condenser 151. This induced voltage, of positive polarity, is applied to the screen grid of tube 145 and makes it conductive during the passage of the character in photographing position. At the exact instance at which the character is in the correct position the photoelectric impulse takes place and is transmitted to an amplifier tube 152 which reverses its polarity and also limits its amplitude. The resulting positive impulse is sent to a trigger tube 153 (preferably of the OA5 type) and allows a condenser 154 to discharge into the induction coil 155. This discharge generates an impulse of several thousand volts which triggers the flash tube L and causes condenser 143 to discharge into this tube.

In order to prevent the fish tube from operating more than once for every revolution condensers 143 and 154 are disconnected from the source of potential in the beginning of the active cycle of the decoder by a cam Ca3. These condensers charge through appropriate resistances during the following cycle devoted to the displacement of the film carriage.

*Timing control*

The photography of one character comprises two cycles, first a photographic cycle during which the character is photographed and a stepping cycle during which the film carriage is displaced. The cams controlling these operations are shown in Figure 11 and are driven by the same shaft as the master character disk. The disk bears the characters on half of its periphery. The two successive cycles take place during a single revolution of the disk. There are ten cams. Cam C*a*1 controls the return of the carriage to its starting position. Cam C*a*2 operates the contacts of the impulse generator G used in the justification computation as previously described. Cam C*a*3 short circuits the decoder during the stepping cycle and prevents any flash from taking place. Cam C*a*4 charges the condenser 143 of the discharge tube and prevents the occurrence of more than one flash per revolution, as described above. Cam C*a*5 controls the operation of the selective stop members of the variable escapement. Cam C*a*6 controls the operation of the variable escapement motor magnet EV. Cam C*a*7 is the start cam which initiates the printing operation by closing the locking circuit of CR and SE relays at the proper instant. Cam C*a*8 controls the sensing carriage EXP and Cam C*a*9 the sensing springs PLP as previously described. Cam C*a*10 controls the locking circuit 126 for the relays T1 to T7, so that the sensing contacts of the register may be freed as soon as they have operated the T relays.

*Changing fonts*

Several fonts of matrices may be accommodated on the same disk, for instance roman on one half and italics on the other half. As stated above, the photography occurs during the first half revolution and the advance of the carriage during the other half. Passing from one font to the other necessitates changing the timing of the cams by one half revolution. This is preferably done by a relay ACF. Each cam from C*a*3 and C*a*10 operates two sets of contacts connected to transfer contacts of relay ACF. When this relay operates it transfers the circuit from one contact of the cams to the other one. The result is that the photographic cycle takes the place of the stepping cycle and vice versa.

Relay ACF is controlled by the register. When the sensing contacts find pins 3—6 (which is the "change-of-font" signal) operated, a potential is applied through relays T3—T6 to relay ACF and relay BCF, Fig. 9. Relays ACF and BCF and the associated resistances *rc* and *rd* together form a flip-flop circuit by the "change-of-font" signal. Simultaneously the control potential is applied to stop pin "zero" to prevent any possible operation of the variable escapement. When the control voltage is removed, the flip-flop assumes its second position, and remains there until signal 3—6 again appears in the register, whereupon the original font is restored.

While the preferred embodiment of the invention has been shown and described, it will be understood that it may be varied in many particulars, and that the invention is not limted to said embodiment.

Having thus described the invention, we claim:

1. A binary counter comprising a member of stages of flip-flop circuits, each flip-flop circuit having a contact representing the zero or unit condition of a stage, a direct entry circuit leading into each stage, a carry-over circuit leading into each stage except the first, and dual relay means for each stage having connections with both the direct entry circuit and the carry-over circuit to operate the flip-flop of said stage, said connections operating in opposition, whereby said stage is inoperative upon simultaneous occurrence of a direct entry to said stage and a carry-over from the preceding stage.

2. A binary counter comprising a number of stages of flip-flop circuits, each flip-flop circuit having a contact representing the zero or unit condition of a stage, a direct entry circuit leading into each stage, a carry-over circuit leading into each stage except the first, a direct entry relay winding for each stage connected to the direct entry circuit and having provision to operate said stage, and a carry-over relay winding for each stage connected to the carry-over circuit and having provision to operate said stage, said windings operating in opposition to prevent operation of said stage on simultaneous occurrence of a direct entry to said stage and a carry-over from the preceding stage.

3. A binary counter comprising a number of stages of flip-flop circuits, each flip-flop circuit having a contact representing the zero or unit condition of a stage, a direct entry circuit leading into each stage, a carry-over circuit leading into each stage except the first, and a two-winding relay to operate each stage having one winding connected to the direct entry circuit and the other winding connected to the carry-over circuit, said windings operating in magnetic opposition to prevent operation of the relay on simultaneous occurrence of a direct entry to said stage and a carry-over from the preceding stage.

4. A binary counter comprising a number of stages of flip-flop circuits, each flip-flop circuit having a contact representing the zero or unit condition of a stage, a direct-entry circuit leading into each stage, a carry-over circuit leading into each stage except the first, a direct entry relay for each stage connected to the direct entry circuit and having contacts to operate said stage, and a carry-over relay for each stage connected to the carry-over circuit and having contacts to operate said stage, said relays having contacts to prevent operation of the stage on simultaneous occurrence of a direct entry to said stage and a carry-over from the preceding stage.

5. A binary counter comprising a number of stages of flip-flop circuits, each flip-flop circuit having an indicating contact representing the zero or unit condition of a stage, a direct entry circuit leading into each stage, a carry-over entry circuit leading into each stage except the first, a carry-over exit circuit leading from each stage having connections through the indicating contact of said stage to produce a carry-over on a direct or carry-over entry to said stage if said contact is closed, and relay means for each stage connected with the direct entry circuit and carry-over entry and exit circuits to operate said stage and to cause a carry-over, said relay means having provision to cause a carry-over and to prevent operation of said stage upon simultaneous occurrence of a direct entry to said stage and a carry-over from the preceding stage.

6. A binary counter comprising a number of stages of flip-flop circuits, each flip-flop circuit having an indicating contact represnting the zero or unit condition of a stage, a direct entry circuit leading into each stage, a carry-over entry circuit leading into each stage except the first, a carry-over exit circuit leading from each stage having connections through the indicating contact of said stage to produce a carry-over on a direct or carry-over entry to said stage if said contact is closed, and dual relay means for each stage connected with the direct entry circuit and the carry-over entry and exit circuits to operate the said stage and to cause a carry-over, said connections to the entry circuits operating in opposition, whereby said stage is inoperative and a carry-over is produced upon simultaneous occurrence of a direct entry to said stage and a carry-over from the preceding stage.

7. A binary counter comprising a number of stages of flip-flop circuits, each flip-flop circuit having an indicating contact representing the zero or unit condition of a stage, a direct entry circuit leading into each stage, a carry-over entry circuit leading into each stage except the first, a carry-over exit circuit leading from each stage having connections through the indicating contact of said stage to produce a carry-over on a direct or carry-over entry to said stage if said contact is closed, a direct entry relay winding for each stage connected to the direct entry circuit and having provision to operate said stage, a carry-over relay winding for each stage connected to the carry-over entry circuit and having provision to operate said stage, and contacts controlled by said windings and connected to the carry-over exit circuit, said windings operating in opposition to prevent operation of said stage and to produce a carry-over on simultaneous occurrence of a direct entry to said stage and a carry-over from the preceding stage.

8. A binary counter comprising a number of stages of flip-flop circuits, each flip-flop circuit having an indicating contact representing the zero or unit condition of a stage, a direct entry circuit leading into each stage, a carry-over entry circuit leading into each stage except the first, a carry-over exit circuit leading from each stage having connections through the indicating contact of said stage to produce a carry-over on a direct or carry-over entry to said stage if said contact is closed, and a two-winding relay to operate each stage having one winding connected to the direct entry circuit, the other winding connected to the carry-over entry circuit, and contacts connected with the carry-over exit circuit, said windings operating in magnetic opposition to prevent operation of the relay and to produce a carry-over on simultaneous occurrence of a direct entry to said stage and a carry-over from the preceding stage.

9. A binary counter comprising a number of stages of flip-flop circuits, each flip-flop circuit having an indicating contact representing the zero or unit condition of a stage, a direct entry circuit leading into each stage, a carry-over entry circuit leading into each stage except the first, a carry-over exit circuit leading from each stage having connections through the indicating contact of said stage to produce a carry-over on a direct or carryover entry to said stage if said contact is closed, a direct entry relay for each stage connected to the direct entry circuit and having contacts to operate said stage, and a carry-over relay for each stage connected to the carry-over circuit and having contacts to operate said stage, said relays having contacts connected with the carry-over exit circuit, said contacts of both relays being arranged to prevent operation of the stage and to produce a carry-over on simultaneous occurrence of a direct entry to said stage and a carry-over from the preceding stage.

10. Photographic composing apparatus comprising a keyboard, a number of code elements operated by the keys of the keyboard, the code elements being divided into a width-selector group for representing numerically the widths of selected characters and a character-selector group for representing particular characters as distinguished from others having the same width, a register for storing information corresponding to a line of characters and interword spaces having register elements corresponding to each of the code elements for each character and space, a line counter, connections between the width-selector group of code elements and the line counter to add the width values of the line, a photographic exposure device controlled by the register elements corresponding to both groups to project the characters successively upon a sheet, and a variable escapement controlled by the register elements corresponding to the width-selector group to space the character projections.

11. Apparatus according to claim 10 including an additional circuit for increasing the maximum number of distinguishable characters of a given width as fixed by the number of character-selector elements used to store each character, said circuit including connections from the keyboard to combinations of the code elements representing unused width values, corresponding connections from the code elements to the line counter to add said given width, and connections controlled by the corresponding register elements to operate the photographic exposure device and variable escapement.

12. In apparatus for composing justified lines, a keyboard, a multi-stage line counter actuated by the keyboard for accumulating the width values of selected characters and interword spaces in a line, an interword counter for counting the number of interwords in the line, a deficit meter calibrated to display the difference between the accumulated width values and the length of a justified line, and an increment meter calibrated to display the ratio of said difference to the number of interwords, said meters being connected in a circuit wherein the deficit meter is connected in parallel with a first series circuit including the increment meter and a resistance variable by the interword counter in accordance to the number of interwords in the line, and said parallel-connected circuit is connected across a voltage proportional to current flowing in a second series circuit including a source of electrical potential and a resistance network connected with the stages of the line counter, said resistance network causing a current in said second series circuit corresponding to the amount by which the number in the line counter is less than its capacity.

13. Apparatus according to claim 12 wherein said line counter comprises a number of binary stages, each stage having a series circuit including a contact which is opened when the stage represents a unit and a resistance corresponding to the order of the stage, and said resistance network includes all of the series circuits in the line counter stages connected in parallel.

14. Apparatus according to claim 12 including a carry-over stepping switch having means to step whenever the line counter exceeds its capacity, and a resistance for each step of the switch, said resistance network including a selected resistance of the switch in parallel with resistances connected to the stages of the line counter.

15. In apparatus for composing justified lines, a keyboard, a multi-stage binary line counter actuated by the keyboard for accumulating the width values of selected characters and interword spaces in a line, subtraction means for the line counter, an interword counter for counting the number of interwords in the line, a deficit meter calibrated to display the difference between the accumulated width values and the length of a justified line, and an increment meter calibrated to display the ratio of said difference to the number of interwords, said meters being connected in a circuit wherein the deficit meter is connected in parallel with a first series circuit including the increment meter and a resistance variable by the interword counter in accordance with the number of interwords in the line, and the terminals of the deficit meter are connected across a voltage proportional to the line deficit, said voltage being derived from a series-parallel circuit including a source of electrical potential, resistances in the stages of the line counter, resistances in the steps of a first stepping switch having means to step whenever the line counter exceeds its capacity, and resistances in the steps of a second stepping switch having correction means to step whenever a line counter subtraction causes a step of the first stepping switch to be erroneous.

16. Photographic composing apparatus comprising a keyboard, a register actuated by the keyboard and having means for storing characters, a line counter, connections between the keyboard and the counter for adding into the counter the width values of the characters, a first stepping switch having a carry-over circuit connected to the last stage of the counter to advance the switch whenever a carry-over impulse from said stage indicates that the counter has exceeded its capacity, subtraction means for the counter, and means for effecting subtraction from the first stepping switch without reversing the direction thereof, said means comprising an additional stepping switch having terminals connected with terminals on the first stepping switch and contact means to change the effective terminal position of the first stepping switch.

17. Photographic composing apparatus comprising a keyboard, a register having means for storing information corresponding to selected characters and spaces in a line including means for numerically representing width values, a multi-stage binary line counter, connections between the keyboard and the counter for adding into the counter the width values of the characters, and correction means for the counter comprising a single inverting relay having contacts in each stage of the counter, energizing means for causing the relay to invert the counter by changing the condition of each stage through said contacts, means actuated by the register for adding into the counter the width value of the erroneous character while said counter is in the inverted condition, and energizing means for causing the relay to reinvert the counter by changing the condition of each stage through said contacts.

18. Photographic composing apparatus comprising a keyboard, a register having means for storing information corresponding to selected characters and spaces in a line including means for numerically representing width values, a multi-stage binary line counter, connections between the keyboard and the counter for adding into the counter the width values of the characters, a first stepping switch connected to the last stage of the counter to advance the switch whenever a carry-over impulse from said stage indicates that the counter has exceeded its capacity, and subtraction means for the counter comprising a single inverting relay having contacts in each stage of the counter, energizing means for causing the relay to invert the counter by changing the condition of each stage through said contacts, means actuated by the register for adding into the counter the width value of the erroneous character while said counter is in the inverted condition, a second stepping switch for effecting subtraction from the first stepping switch without reversing the direction thereof including a switch transferring any carry-over impulse from the last stage of the counter on the last-mentioned addition to the second stepping switch, whereby a step of the second stepping switch changes the effective terminal position of the first stepping switch, and energizing means for causing the relay to reinvert the counter by changing the condition of each stage through said contacts.

19. Apparatus according to claim 18 including a correction cycling switch having a number of levels connected to the first and second stepping switches, the register and the counter, said cycling switch being operable to perform the consecutive steps of inverting the counter, adding into the counter the width value of the erroneous character, and reinverting the counter.

20. Photographic composing apparatus comprising a keyboard, a register having means for storing information corresponding to selected characters and spaces in a line including means for numerically representing width values, a photographic unit actuated by the register to project selected characters upon a sheet, a variable-motion device operable by the register for causing relative displacement of character projections on the sheet, a zone switch for controlling operation of the variable-motion device having a number of terminals representing increment sides, said switch having two levels, a contact on one level for introducing increments of space between interwords only, and a contact on the other level for introducing increments between characters.

21. Photographic composing apparatus comprising a keyboard, a register having means for storing coded information corresponding to the characters and sensing means adapted to sense the stored characters consecutively, a character carrier upon which the characters are disposed, means for causing movement of the characters through a projection position, projection apparatus for projecting selected characters upon a sheet, a variable-motion device for causing relative displacement of character projections on the sheet, a plurality of relays actuated by the register sensing means, holding means for said relays to hold their contacts for a predetermined time after each actuation by the register sensing means, said time being not less than the time necessary for all selectable characters to pass the projection position, and connections from said relay contacts to control the operation of the photographic unit and variable-motion device according to the characters stored in the register, whereby the sensing means moves to a position to sense the next succeeding character in the register before said projection and displacement is completed for the character preceding it.

22. Photographic composing apparatus comprising a keyboard, a register having means for storing coded information corresponding to the characters and sensing means adapted to sense the stored characters consecutively, means for photographing images of the characters upon a sheet, a variable-motion device for causing relative displacement of the character images on the sheet, a plurality of relays actuated by the register sensing means, holding means for said relays to hold their contacts for a predetermined time after each actuation by the register sensing means, said time being not less than the time necessary to photograph a character, and connections from said relay contacts to control the operation of the photographing means and variable-motion device according to the character stored in the register, whereby the sensing means moves to a position to sense the next succeeding character in the register before said photography and displacement are completed for the character preceding it.

23. A binary counter having a plurality of stages each capable of assuming two stable conditions, carry-over means for each stage except the first, entry means for successively accumulating numbers in the counter including circuits for introducing impulses corresponding to each number directly into selected stages, said impulses causing the stages to change from a condition representing the total of the numbers previously accumulated to a condition representing the total of the numbers previously accumulated and said number, relay means for preventing a change of condition of any stage when said stage receives both a direct impulse and a carry-over impulse from the preceding stage, and time delay relay means initiated by the entry means for changing the condition of any stage on either a direct impulse or a carry-over from the preceding stage.

24. A binary counter comprising a number of stages of flip-flop circuits, each flip-flop circuit having a contact representing the zero or unit condition of a stage, a carry-over circuit leading into each stage except the first, entry means for successively accumulating numbers in the counter including a direct entry circuit leading into each stage for selectively introducing direct impulses corresponding to each number, said impulses causing the stages to change from a condition representing the total of the numbers previously accumulated to a condition representing the total of the numbers previously accumulated and said number, relay means actuated by the entry means to prevent a change of condition of a stage upon simultaneous occurrence of a direct entry to said stage and a carry-over from the preceding stage, and time delay relay means initiated by the entry means to cause a change of condition of a flip-flop on either a direct entry or a carry-over from the preceding stage.

25. A binary counter having a plurality of stages each capable of assuming two stable conditions, carry-over means for each stage except the first, means for successively accumulating numbers in the counter including circuits for introducing impulses corresponding to each number directly into selected stages, said impulses causing the stages to change from a condition representing the total of the numbers previously accumulated to a condition representing the total of the numbers previously accumulated and said number, a relay for a stage having two windings in magnetic opposition, and connections to energize one of said windings by a direct impulse and the other winding by a carry-over impulse from the preceding stage, said relay providing circuits for causing a change of condition of the stage on either a direct impulse or a carry-over from the preceding stage, and for preventing a change of condition of the stage and causing a carry-over when both windings are energized.

26. A binary counter having a plurality of stages each capable of assuming two stable conditions, carry-over means for each stage except the first, means for successively accumulating numbers in the counter including circuits for introducing impulses corresponding to each number directly into selected stages, said impulses causing the stages to change from a condition representing the total of the numbers previously accumulated to a condition representing the total of the numbers previously accumulated and said number, two relays for a stage, and connections to energize one relay by a direct impulse and the other relay by a carry-over impulse from the preceding stage, said relays providing circuits for causing a change of condition of the stage on either a direct impulse or a carry-over from the preceding stage, and for preventing a change of condition of the stage and causing a carry-over when both relays are energized.

References Cited in the file of this patent

UNITED STATES PATENTS

| Number | Name | Date |
|---|---|---|
| 1,540,741 | Hunter et al. | June 2, 1925 |
| 1,647,408 | Hunter | Nov. 1, 1927 |
| 1,723,784 | Hunter et al. | Aug. 6, 1929 |
| 1,732,049 | Hunter | Oct. 15, 1929 |
| 1,805,333 | Hunter | May 12, 1931 |
| 2,011,887 | Bell | Aug. 20, 1935 |
| 2,052,844 | Prusso et al. | Sept. 1, 1936 |
| 2,261,538 | Brand | Nov. 4, 1941 |
| 2,278,993 | Johnson | Apr. 7, 1942 |
| 2,318,591 | Couffignal | May 11, 1943 |
| 2,320,337 | Bryce | June 1, 1943 |
| 2,354,768 | Nokes | Aug. 1, 1944 |
| 2,379,862 | Bush | July 10, 1945 |
| 2,398,238 | McNatt | Apr. 9, 1946 |
| 2,402,751 | Huebner | June 25, 1946 |
| 2,408,754 | Bush | Oct. 8, 1946 |
| 2,409,689 | Norton et al. | Oct. 22, 1946 |
| 2,409,698 | Lewis | Oct. 22, 1946 |
| 2,419,836 | Holbrook | Apr. 29, 1947 |
| 2,441,899 | Ogden | May 18, 1948 |
| 2,503,765 | Rajchman et al. | Apr. 11, 1950 |
| 2,568,932 | Rajchman et al. | Sept. 25, 1951 |